United States Patent
De Léon

(10) Patent No.: US 7,710,349 B2
(45) Date of Patent: May 4, 2010

(54) METHODS AND SYSTEMS FOR SHARING MULTIMEDIA APPLICATION DATA BY A PLURALITY OF COMMUNICATION DEVICES

(75) Inventor: David De Léon, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 963 days.

(21) Appl. No.: 11/487,529

(22) Filed: Jul. 14, 2006

(65) Prior Publication Data

US 2007/0027960 A1 Feb. 1, 2007

Related U.S. Application Data

(60) Provisional application No. 60/702,968, filed on Jul. 27, 2005.

(30) Foreign Application Priority Data

Jul. 18, 2005 (EP) ................... 05015548

(51) Int. Cl.
*G06F 15/00* (2006.01)
(52) U.S. Cl. ............ 345/1.1; 345/1.2; 345/2.1; 345/3.1; 345/156; 345/530
(58) Field of Classification Search .......... 345/1.1, 345/1.2, 2.1, 2.2, 2.3, 3.1, 204, 156, 173, 345/501, 502, 530, 531; 358/1.13, 1.15
See application file for complete search history.

(56) References Cited

U.S. PATENT DOCUMENTS 6,633,809 B1  10/2003  Aizono et al.
2003/0093538 A1 * 5/2003 Tsuchiuchi ............... 709/229
2004/0080768 A1 * 4/2004 Larson ..................... 358/1.13
2004/0131282 A1 * 7/2004 Yoshida et al. ........... 382/312
2005/0043043 A1   2/2005 Winn
2005/0276459 A1 * 12/2005 Eames et al. ............. 382/141
2005/0289117 A1 * 12/2005 Hiraishi et al. ............ 707/2
2006/0150224 A1 * 7/2006 Kamariotis ................ 725/89

FOREIGN PATENT DOCUMENTS

WO  WO 2004/084536 A1  9/2004

OTHER PUBLICATIONS

European Search Report (2 pages) corresponding to European Application No. EP05015548; Dated: Nov. 11, 2005.

* cited by examiner

*Primary Examiner*—Bipin Shalwala
*Assistant Examiner*—Vince E Kovalick
(74) *Attorney, Agent, or Firm*—Myers Bigel Sibley & Sajovec, PA

(57) ABSTRACT

In a method for sharing multimedia application data by a plurality of communication devices, at least two communication devices establish a short-rang wireless communication link to a data distribution device. At least one of the communication devices informs the data distribution device of the data that are offered for sharing, and these data are presented by the data distribution device on a display. A user of one of the communication devices being connected to the data distribution device selects and requests data that he wants to download to a communication device, and the requested data are then transmitted to the communication device via the data distribution device.

21 Claims, 1 Drawing Sheet

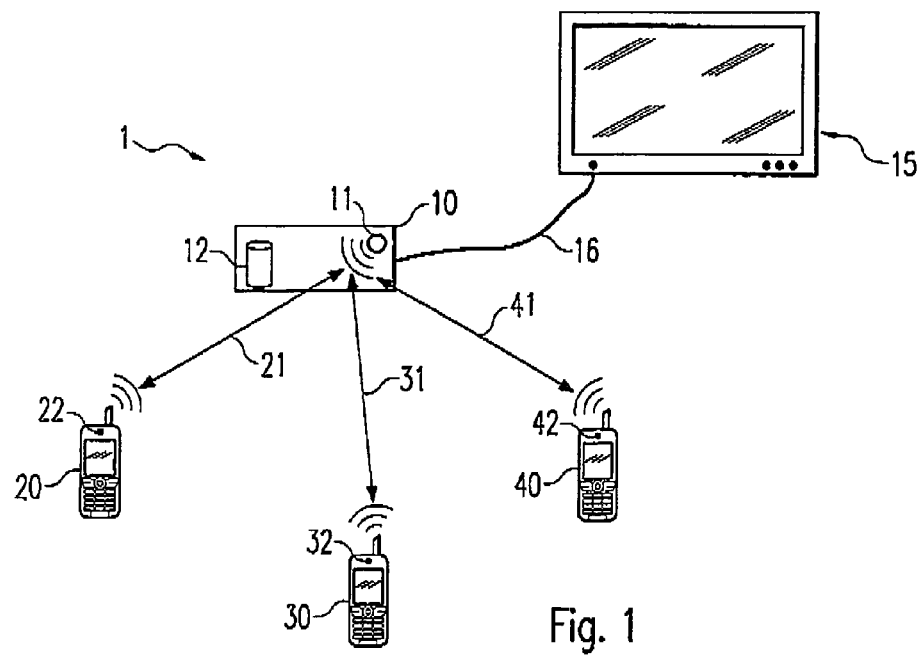
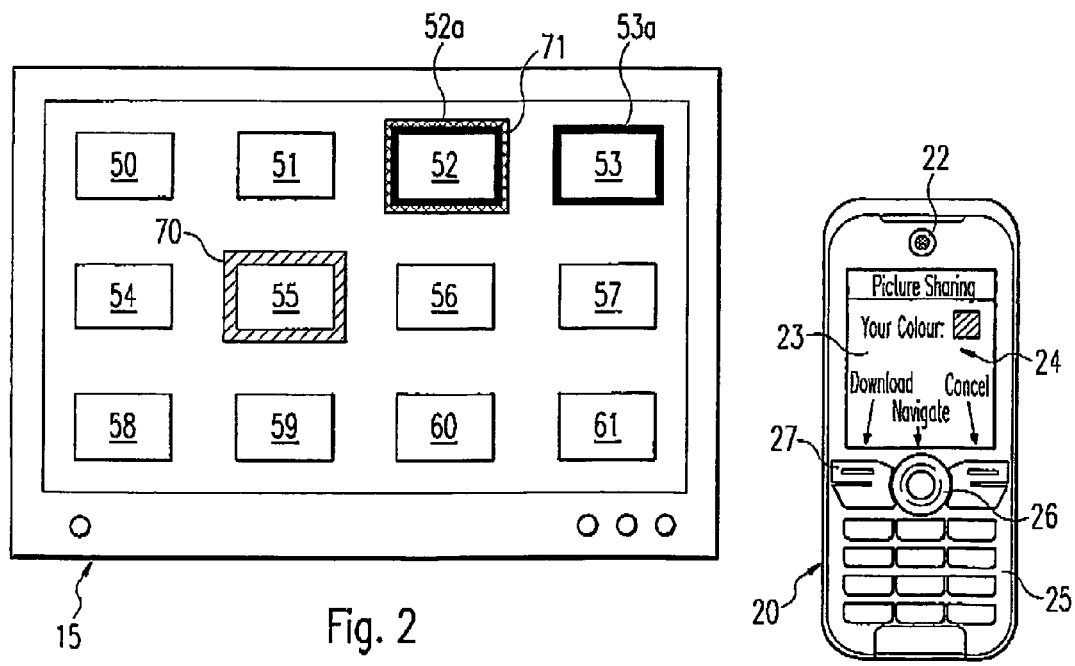

METHODS AND SYSTEMS FOR SHARING MULTIMEDIA APPLICATION DATA BY A PLURALITY OF COMMUNICATION DEVICES

CROSS REFERENCE TO RELATED APPLICATIONS

This patent application claims priority under 35 U.S.C. §119 to European Patent Application No. 05 015 548.0 entitled "Method and system for sharing multimedia application data by a plurality of communication devices", filed on Jul. 18, 2005 in the European Patent Office, the disclosure of which is hereby incorporated by reference. This application further claims the benefit of and priority to U.S. Provisional Patent Application No. 60/702,968 entitled "Method and system for sharing multimedia application data by a plurality of communication devices", filed Jul. 27, 2005, the disclosure of which is hereby incorporated herein by reference.

FIELD OF THE INVENTION

The present invention relates to a method for sharing multimedia application data by a plurality of communication devices. Said multimedia application data that are shared by the communication devices are in particular video and audio data and/or digital pictures. Furthermore, the present invention also relates to a system for sharing multimedia application data.

DESCRIPTION OF RELATED ART

The advent of digital photography as well as the Internet have considerably increased the possibilities for people to share their pictures. The costs of the duplication of a digital picture are negligible and data files can be easily sent via the Internet and stored by the users on their computers.

Within the last years, the quality of digital cameras has been considerably increased. Nowadays, also mobile communication devices, e.g. mobile phones, comprise integrated digital cameras wherein the quality of these cameras has approached the quality of classical digital compact cameras. Thus, the need to share pictures taken with such camera phones increases. However, so far only limited possibilities of sharing pictures between phones exist.

Today, there are a handful of different ways in which pictures taken with a camera phone or other data that can be used in multimedia applications of such phones can be shared amongst different users. The most common way for sharing these data is to transmit single data files, e.g. via IR, Bluetooth or e-mail from one user to another. Additionally, also physically exchanging memory cards or using a computer as an intermediary device allows the sharing of data.

One problem involved with the current methods for sharing multimedia application data is that there is no way for several users to simultaneously exchange data material in an easy and spontaneous manner. Mobile phones have only small screens and only a few pictures can be seen at the same time. Thus, even with a small group of users it is impractical to see all the pictures that people have taken. Furthermore, it is complicated to keep track of who wants which picture and laborious to ensure that everyone really gets what he wants.

Accordingly, there is a need for a new possibility of sharing multimedia application data by a plurality of communication devices.

SUMMARY

The present invention aims to solve the above-mentioned problem by providing a method for sharing multimedia application data by a plurality of communication devices, wherein said method comprises the following steps:
a) at least two communication devices establish a short-range wireless communication link to a data distribution device;
b) at least one of the communication devices informs the data distribution device on the data that are offered for sharing;
c) the data offered by the communication devices for sharing are presented by the data distribution device on at least one display;
d) one of the communication devices being connected to the data distribution device transmits a requesting information to said data distribution device, said requesting information identifying data that are requested for download to the communication device; and
e) the requested data are transmitted to the communication device by the data distribution device.

The method according to the present invention is based on the idea of providing a central unit, the so-called data distribution device, that is responsible for the data distribution and therefore simultaneously connected to all communication devices. The central data distribution device informs on the data that are offered for sharing and is further responsible for the transmission of the data that are requested by at least one of the users of the inventive method. In case a user decides that he wants to download at least one of the application data offered, the data distribution device will automatically take the necessary steps in order to ensure that the user gets the data he has asked for. Accordingly, an automatic way for sharing data is provided which allows a plurality of users to simultaneously select and download data in a very convenient way.

The data that are shared between the communication devices in accordance with the present invention are preferably pictures that have been taken with digital cameras. However, a person skilled in the art will readily understand that the method of the present invention could also be used for sharing audio/video data or other data that can be used by communication devices with one of their multimedia applications.

In a preferred embodiment of the present invention, the data that are offered for sharing by the different communication devices are transmitted to the data distribution device and stored by said data distribution device in specific storing means. In case one of the communication devices requests the download of one of the offered data, the data distribution device will directly transmit the requested data to said communication device.

Alternatively, it would also be possible that the communication device which offers data for sharing only transmits information on the content of the data that are offered for sharing to the data distribution device. In this case, data that have been requested for download by one of the participants of the system are at first transmitted from the communication device offering these data to the data distribution device and afterwards forwarded by the data distribution device to the communication device that has requested these data. Accordingly, the data transmission always takes place from the data distribution device to one of the communication devices or in the other direction. A bi-directional communication link, however, only between two participants of the data sharing system is not necessary. In this way, all participants of the data distribution system can browse the offered data and download them at the same time.

The presentation of the data that are offered for sharing by the data distribution device can take place in different ways. According to one embodiment of the present invention, the data distribution device is connected to a display—e.g. to a TV—and graphically presents the data that could actually be downloaded. In case said data refer to pictures, thumbnails of the pictures are shown on the TV screen. Each participant of the data sharing system is now able to browse over the screen of the TV in order to select specific data and request a download of these selected data. This browsing is e.g. achieved by assigning selection devices—e.g. coloured frames—to the different participants of the distribution system wherein the user is able to move his frame over the TV screen in order to select one of the pictures.

In a second embodiment, the data offered for sharing are presented in a slideshow mode showing successively the offered pictures in full screen for several seconds. If a participant of the data distribution system decides that he would like to download the data actually presented by the data distribution device, he transmits a request information to the data distribution device which in response to said request information transmits the data for download to the communication device. In this second embodiment, it would also be possible to use the displays of the different communication devices in order to present the slideshow directly on these displays. Again, a short information on the data that are offered for download is presented on the screen of each device and the user is free to select these data in order to download them.

In accordance with the present invention, also a system for sharing multimedia application data is provided wherein said system comprises one data distribution device and at least two communication devices that are connected to the data distribution device via a short-range wireless communication link, wherein the data distribution device is adapted to
a) receive information from at least one of the communication devices, said information informing on data that are offered for sharing by said communication device;
b) present the data that are offered by the communication devices for sharing on a display;
c) receive a requesting information of at least one of the communication devices informing on the data that said communication device wants to download; and
d) transmit the requested data to the communication device.

Methods for sharing multimedia application data by a plurality of communication devices according to some embodiments of the invention include: a) establishing respective short-range wireless communication links from a plurality of communication devices to a data distribution device, b) informing the data distribution device of data that are offered for sharing by at least one of the plurality of communication devices, c) presenting on a display, by the data distribution device, an indication of the data offered for sharing by the at least one communication device, d) transmitting an information request from a second of the plurality of communication devices to the data distribution device, the information request identifying data that are requested for download to the second communication device, and e) transmitting the requested data to the second communication device via the data distribution device.

Informing the data distribution device of the data that are offered for sharing may include transmitting the data that are offered for sharing to the data distribution device and storing the data that are offered for sharing at the data distribution device.

Transmitting the requested data to the second communication device via the data distribution device may include transmitting the requested data directly to the second communication device from the data distribution device.

The data stored by the data distribution device may be deleted or may be kept stored if the communication link between the data distribution device and the at least one communication device is terminated.

Informing the data distribution device of the data that are offered for sharing by the at least one communication device may include transmitting information about the content of the data that are offered for sharing from the at least one communication device to the data distribution device. In transmitting the requested data to the second communication device via the data distribution device, the data may be at first transmitted from the at least one communication device to the data distribution device, and may then be forwarded to the second communication device.

The methods may further include graphically displaying a selection at the second communication device corresponding to the data that are offered for sharing, and selecting data requested for download from among the data that are offered for sharing.

Data that have been requested by at least one of the communication devices may be graphically indicated on the display.

The communication links established between the communication devices and the data distribution device may include a Bluetooth link.

The data that are offered for sharing may include digital pictures. The pictures offered for sharing may be presented as thumbnails on the display by the data distribution device. A plurality of the thumbnails may be simultaneously and/or successively shown on the display. In some embodiments, the thumbnails may be shown on the displays of the communication devices.

A system for sharing multimedia application data according to some embodiments of the invention includes a data distribution device and at least two communication devices that are connected to the data distribution device via respective short-range wireless communication links. The data distribution device may be configured to a) receive information from at least one of the communication devices relative to data that are offered for sharing by the at least one communication device, b) present the data that are offered by the at least one communication device for sharing on a display, c) receive an information request from a second of the communication devices, the information request identifying the data that are requested for downloading by the second communication device, and d) transmit the requested data to the second communication device.

BRIEF DESCRIPTION OF THE DRAWINGS

In the following, the present invention is explained in more detail with respect to the accompanying drawings.

FIG. 1 schematically shows a system for sharing multimedia application data by a plurality of communication devices in accordance with the method of the present invention;

FIG. 2 shows an enlargement of the presentation of the data that are offered for sharing on a TV screen and FIG. 3 shows a communication device that has been logged to a data sharing session.

DETAILED DESCRIPTION OF EMBODIMENTS OF THE INVENTION

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

In FIG. 1, a system for sharing multimedia application date in accordance with the present invention is generally designed by 1. Main elements of the system 1 are a data distribution device 10 and a plurality of participants of the system that are represented by mobile phones 20, 30, 40.

In the present embodiment, the system 1 is used for sharing pictures taken by the mobile phones 20, 30, 40 with their integrated digital cameras 22, 32, 42. A possible scenario for the use of the present invention is a party where the guests of the party would like to share the pictures they have taken with their camera phones 20, 30, 40. It is commonly known that such pictures can be transferred from one phone to another by using a bi-directional communication link (e.g. Bluetooth) or by sending an MMS over a communication network. However, by using this conventional method for sharing pictures, it would be very complicated to distribute all pictures which are offered for sharing to all participants of the system 1.

In order to avoid this problem, a central data distribution device 10 is provided which is connected with each of the communication devices 20, 30, 40 via a short-range communication link 21, 31, 41. Preferably, the short-range communication links 21, 31, 41 are communication links in accordance with the known Bluetooth standard. The data distribution device 10 therefore comprises communication means 11 for establishing parallel communication links to all participants of the system 1.

In order to inform all participants of the system 1 at the same time on the data that are offered for sharing, a central display device 15 is provided which is connected with the data distribution device 10. In the present embodiment, the display device 15 is represented by a conventional TV which is connected to the data distribution device 10 via a cable 16. It would also be possible to integrate the data distribution device 10 with the TV 15.

Generally spoken, the present system 1 is based on the idea that all participants of the system 1 inform the central data distribution device 10 on the data they would like to offer for sharing. The data distribution device 10 then presents the offered data on the TV screen 15 and each participant can freely decide which of the data he wants to download. A user can now inform the data distribution device 10 on these data he would like to download on his phone 20, 30, 40 and the data transfer is afterwards initiated by the data distribution device 10.

In more detail, the system 1 works as follows:

In order to share pictures taken with the digital cameras 22, 32, 42 integrated in the mobile phones 20, 30, 40, a user of the e.g. first mobile phone 20 initiates the so-called picture-sharing mode. This option could e.g. be made available in the picture folder and/or the camera application of the mobile phone 20. Alternatively, this mode could automatically be initiated when the mobile phone is within the Bluetooth communication range of the data distribution device 10. In case the user of the phone 20 manually initiates the picture sharing mode, the phone 20 then searches for the data distribution device 10 in its neighbourhood by using its Bluetooth communication means.

After having established the communication link 21 to the data distribution device 10, the phone 20 sends all pictures that the user wants to offer for sharing to the data distribution device 10. This could mean that all pictures are transferred to the data distribution device 10. However, the user could also decide to offer only a user-specified subset of the pictures stored on his phone. The data distribution device 10 comprises internal storing means 12 in order to store the digital data that are later offered for download to all participants of the system 1.

After having received pictures from at least one of the participants of the system 1, the data distribution device 10 informs all participants on the data that are offered for download. According to a first embodiment of the present invention, this is realised by displaying thumbnails of all pictures that have been received from the participants 20, 30, 40. As shown in FIG. 2, the TV screen 15 connected to the data distribution device 10 displays several thumbnails 50 to 61 of the pictures that can be downloaded by all mobile communication devices that have activated the picture sharing mode.

Each mobile communication device that has been connected to the data distribution device 10 and is therefore a participant of the system 1 is automatically assigned a colour by the data distribution device. E.g., the user of the mobile phone 20 is informed on the colour that has been assigned to his mobile phone 20 by a message 24 that is shown on the display 23 of the phone 20 as it is shown in FIG. 3. Now, a selection device, e.g. a small frame 70, in the same colour that has been assigned to the mobile phone 20 appears on the TV screen 15. In FIG. 2, another selection device in the form of a frame 71 in a second colour is also shown on the screen 15 informing that a second user is logged to the actual data sharing session.

The user is now able to navigate this selection device 70 over the TV screen 15 in order to select pictures that he is interested in and to request a download of this data. The navigation over the TV screen 15 takes place by using the keypad of the mobile phone 20 wherein specific keys are used in order to move the frame 70 to the left or to the right, upwards or downwards. In the embodiment shown in FIG. 3, the cursor or joystick key 26 is used for generating this navigation information which is then forwarded to the data distribution device 10 via the Bluetooth link.

After having marked a picture that the user is interested in, he can request a download of this picture by pressing a specific selection key 27 on the keypad 25 of the phone 20 which initiates a transfer of the respective data stored in the storing means 12 of the data distribution device 10 to the phone 20. In this way, all users logged to the data distribution device 10 can simultaneously move their coloured selection devices 70, 71 over the screen and request pictures. Thus, a very convenient way is provided for sharing pictures by a plurality of persons.

There are several ways how the system explained above can be modified.

A first possibility would be to graphically indicate which pictures have been downloaded in order to show which pictures were successfully offered for sharing. This graphical indication could be realised e.g. by increasing the thickness of the frame around the respective thumbnail. As e.g. shown in FIG. 2, the two pictures 52, 53 in the upper right corner of the TV screen 15 have already been downloaded by at least one user which is indicated by a thicker frame 52a, 53a.

Normally, pictures that are offered by a specific user are automatically removed from the storing means 12 of the data distribution device 10 if the user has left the communication range of the data distribution device 10. Since the user is not anymore a participant of the data sharing session, it is no longer possible to download pictures that have been offered by this user. However, it would also be possible to leave the pictures within the storing means 12 even when the user is absent. E.g., the pictures could be stored for a specific time after the user has left the system 1 in order to allow other users to still download these pictures. Both options could be provided to the participants of the system 1 wherein each user can freely decide whether his pictures can be downloaded only as long as he is a participant of the system 1 or whether pictures can be downloaded for a longer time span.

Another possibility for further developing the system 1 would be that the users can choose the option that pictures that they are taking while they are connected to the data distribution device 10 are automatically uploaded to the data distribution device 10. Thus, each picture a user takes during the picture sharing session is automatically offered for sharing to the other users of the system 1.

A further way of modifying the system of the present invention relates to the transmission of the data. In the embodiment explained above, the complete data files of the pictures that are offered for sharing are transferred from the mobile phones 20, 30, 40 to the data distribution device 10 after the Bluetooth link has been established. However, it would also be possible that the phones 20, 30, 40 transfer at the beginning only a short information on the data that are offered for sharing. For example, the phones 20, 30, 40 could only transmit thumbnails of the pictures to the data distribution device 10 that are then presented on the display 15. Only after a picture has been really requested for download, the complete data file is forwarded from the originating phone to the requesting phone via the data distribution device 10.

When there are no users actively browsing pictures on a TV screen 15, the data distribution device 10 could change to a so-called slideshow mode in which any pictures left on the data distribution device 10 are shown in full screen on the TV 15. If this mode is combined with the option mentioned above of pictures being automatically uploaded to the data distribution device 10, the slideshow might be set to favour recent pictures over old ones. During the slideshow mode, users that have remained connected to the data distribution device 10 can press a specific selection key on their phones in order to initiate a download of the picture that is currently displayed on the screen. Thus, instead of showing all pictures that are offered for sharing at the same time, the pictures are now successively presented and a user can select a picture which is actually shown if he is interested in it.

The slideshow mode could also be used in order to transfer small thumbnails to all users that are connected to the data distribution device 10. In this case, the thumbnails would be successively shown on the displays of the multimedia communication devices and again a user can choose to download the data is case he is interested in the actually shown information. In this way, the screens of the communication devices can additionally or alternatively be used in order to present the pictures that are offered for download.

Accordingly, each user is free to select one of the offered pictures and download it to its communication device. A specific advantage of the present invention is that all users are allowed to simultaneously browse and download content that is distributed on the several devices of the users. Thus, the present invention provides a very convenient way in order to share multimedia application data.

As already mentioned above, the present invention is not restricted to the idea of sharing pictures taken with digital cameras. E.g., it would also be possible to share video or audio data by using the system of the present invention. Generally, data that could be used by multimedia applications of communication devices can be shared with the present invention in a very convenient way.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A method for sharing multimedia application data by a plurality of communication devices, the method comprising:
   a) establishing respective short-range wireless communication links from a plurality of communication devices to a data distribution device;
   b) informing the data distribution device of data that are offered for sharing by at least one of the plurality of communication devices;
   c) presenting on a display, by the data distribution device, an indication of the data offered for sharing by the at least one communication device;
   d) transmitting an information request from a second of the plurality of communication devices to the data distribution device, the information request identifying data that are requested for download to the second communication device; and
   e) transmitting the requested data to the second communication device via the data distribution device;
   wherein informing the data distribution device of the data that are offered for sharing comprises transmitting the data that are offered for sharing to the data distribution device and storing the data that are offered for sharing at the data distribution device; and wherein the data stored by the data distribution device are deleted if the communication link between the data distribution device and the at least one communication device is terminated.

2. The method of claim 1, wherein transmitting the requested data to the second communication device via the data distribution device comprises transmitting the requested data directly to the second communication device from the data distribution device.

3. The method of claim 1, wherein informing the data distribution device of the data that are offered for sharing by the at least one communication device comprises transmitting information about the content of the data that are offered for sharing from the at least one communication device to the data distribution device; and wherein, in transmitting the requested data to the second communication device via the data distribution device, the data are at first transmitted from the at least one communication device to the data distribution device, and are forwarded to the second communication device.

4. The method of claim 1, further comprising graphically displaying at the second communication device a selection corresponding to the data that are offered for sharing, and selecting data requested for download from among the data that are offered for sharing.

5. The method of claim 1, wherein data that have been requested by at least one of the communication devices are graphically indicated on the display.

6. The method of claim 1, wherein the communication links established between the communication devices and the data distribution device comprise a Bluetooth link.

7. The method of claim 1, wherein the data that are offered for sharing comprise digital pictures.

8. The method of claim 7, wherein the pictures offered for sharing are presented as thumbnails on the display by the data distribution device.

9. The method of claim 8, wherein a plurality of the thumbnails are simultaneously shown on the display.

10. The method of claim 8, wherein the thumbnails are successively shown on the display.

11. The method of claim 10, wherein the thumbnails are shown on the displays of the communication devices.

12. The method of claim 7, wherein the pictures offered for sharing are shown successively on the display.

13. A system for sharing multimedia application data, comprising:
a data distribution device and at least two communication devices that are connected to the data distribution device via respective short-range wireless communication links;
wherein the data distribution device is configured to:
a) receive information from at least one of the communication devices relative to data that are offered for sharing by the at least one communication device, and store the data that are offered for sharing at the data distribution device;
b) present the data that are offered by the at least one communication device for sharing on a display;
c) receive an information request from a second of the communication devices, the information request identifying the data that are requested for downloading by the second communication device;
d) transmit the requested data to the second communication device; and
e) delete the data stored at the data distribution device if the communication link between the data distribution device and the at least one communication device is terminated.

14. A method for sharing multimedia application data by a plurality of communication devices, the method comprising:
a) establishing respective short-range wireless communication links from a plurality of communication devices to a data distribution device;
b) informing the data distribution device of data that are offered for sharing by at least one of the plurality of communication devices;
c) presenting on a display, by the data distribution device, an indication of the data offered for sharing by the at least one communication device;
d) transmitting an information request from a second of the plurality of communication devices to the data distribution device, the information request identifying data that are requested for download to the second communication device; and
e) transmitting the requested data to the second communication device via the data distribution device;
wherein informing the data distribution device of the data that are offered for sharing comprises transmitting the data that are offered for sharing to the data distribution device and storing the data that are offered for sharing at the data distribution device; and
wherein the data distribution device keeps the stored data if the communication link between the data distribution device and the at least one communication device is terminated.

15. The method of claim 14, wherein transmitting the requested data to the second communication device via the data distribution device comprises transmitting the requested data directly to the second communication device from the data distribution device.

16. The method of claim 14, wherein informing the data distribution device of the data that are offered for sharing by the at least one communication device comprises transmitting information about the content of the data that are offered for sharing from the at least one communication device to the data distribution device; and wherein, in transmitting the requested data to the second communication device via the data distribution device, the data are at first transmitted from the at least one communication device to the data distribution device, and are forwarded to the second communication device.

17. The method of claim 14, further comprising graphically displaying at the second communication device a selection corresponding to the data that are offered for sharing, and selecting data requested for download from among the data that are offered for sharing.

18. The method of claim 14, wherein data that have been requested by at least one of the communication devices are graphically indicated on the display.

19. The method of claim 14, wherein the communication links established between the communication devices and the data distribution device comprise a Bluetooth link.

20. The method of claim 14, wherein the data that are offered for sharing comprise digital pictures.

21. A method for sharing multimedia application data by a plurality of communication devices, the method comprising:
a) establishing respective short-range wireless communication links from a plurality of communication devices to a data distribution device;

b) informing the data distribution device of data that are offered for sharing by at least one of the plurality of communication devices;
c) presenting on a display, by the data distribution device, an indication of the data offered for sharing by the at least one communication device;
d) transmitting an information request from a second of the plurality of communication devices to the data distribution device, the information request identifying data that are requested for download to the second communication device; and
e) transmitting the requested data to the second communication device via the data distribution device;

wherein informing the data distribution device of the data that are offered for sharing by the at least one communication device comprises transmitting information about the content of the data that are offered for sharing from the at least one communication device to the data distribution device; and wherein, in transmitting the requested data to the second communication device via the data distribution device, the data are at first transmitted from the at least one communication device to the data distribution device, and are forwarded to the second communication device.

* * * * *